(12) United States Patent
Krishnan et al.

(10) Patent No.: US 10,896,200 B1
(45) Date of Patent: Jan. 19, 2021

(54) REMOTE MIRRORING FOR DATA STORAGE SYSTEMS USING CLOUD BACKUP

(71) Applicant: EMC IP Holding Company LLC, Hopkinton, MA (US)

(72) Inventors: Suresh Krishnan, Shrewsbury, MA (US); Wayne D'Entremont, Attleboro, MA (US); Adnan Sahin, Needham, MA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 556 days.

(21) Appl. No.: 15/198,304

(22) Filed: Jun. 30, 2016

(51) Int. Cl.
*G06F 16/27* (2019.01)
*H04L 29/08* (2006.01)

(52) U.S. Cl.
CPC .......... *G06F 16/273* (2019.01); *G06F 16/275* (2019.01); *H04L 67/1034* (2013.01); *H04L 67/1097* (2013.01)

(58) Field of Classification Search
CPC . G06F 16/273; G06F 16/275; H04L 67/1097; H04L 67/1034
See application file for complete search history.

(56) References Cited

U.S. PATENT DOCUMENTS

| | | | |
|---|---|---|---|
| 7,240,238 B2 | 7/2007 | Yanai et al. | |
| 7,647,460 B1 | 1/2010 | Wilson et al. | |
| 7,653,668 B1 * | 1/2010 | Shelat | G06F 16/184 707/610 |
| 7,693,960 B1 * | 4/2010 | Harman | H04L 67/1097 709/217 |
| 8,886,714 B2 | 11/2014 | Brand | |
| 2005/0243609 A1 * | 11/2005 | Yang | G06F 3/0617 365/189.05 |
| 2005/0256972 A1 * | 11/2005 | Cochran | G06F 11/2071 709/245 |
| 2016/0216904 A1 * | 7/2016 | Joshi | G06F 3/0619 |

* cited by examiner

*Primary Examiner* — James Trujillo
*Assistant Examiner* — Kurt A Mueller
(74) *Attorney, Agent, or Firm* — BainwoodHuang

(57) ABSTRACT

A distributed data storage system includes first and second data storage systems (DSSs) at respective sites and a cloud gateway at a third. The first DSS remotely mirrors data using synchronous and asynchronous channels both employing a block-based protocol (e.g., SCSI). The second DSS is connected to the synchronous channel to provide synchronous backup to the first DSS. The cloud gateway is connected to the asynchronous channel and has a cloud storage connection to a cloud storage system, the cloud storage connection using a wide area network interface and employing an object-based protocol. The cloud gateway (1) provides asynchronous backup to the first DSS via the asynchronous channel, and (2) uses the cloud storage connection to access object-based cloud data storage to store data of the asynchronous backup. The use of the cloud gateway and cloud storage system for an asynchronous third mirror enhances reliability/resiliency in a cost-effective manner.

20 Claims, 4 Drawing Sheets

REMOTE MIRRORING FOR DATA STORAGE SYSTEMS USING CLOUD BACKUP

BACKGROUND

The present invention is related to the field of data storage systems, and in particular to remote mirroring functionality of high-resiliency data storage systems such as used in large, mission-critical online data processing systems.

SUMMARY

Remote mirroring solutions allow an organization to have two or more copies of data in different locations to enable continued operation in case of a disaster affecting less than all locations. One common solution has two mirrors (a primary copy and one backup) with either an "active-passive" or A-P setup (secondary is backup only) or an "active-active" or A-A setup (primary and secondary are both active and serve as backup for each other). Adding a 3rd mirror adds complications but is sometimes required for more resiliency.

Proposed is a methodology in which remotely mirrored devices have an asynchronous cloud mirror, improving protection while also providing enhanced functionality due to the wide-scale accessibility of cloud data. In one example a setup may have stretched-cluster hosts, each connected to a different storage array, with the arrays connected either active-passive or active-active, as described more herein. Each array has a local mirror and a cloud based mirror, using a cloud gateway connected to an object-based cloud storage system/service. A write to an active array is first synchronously sent to and stored on the other array. Additionally, each array asynchronously (e.g., at regular intervals on the order of seconds) sends the data to the cloud. Such an arrangement can ensure the existence of an asynchronous mirror in the cloud should one of the arrays fail. Alternatively, data can be backed up to the cloud from only one array, then when one array fails the surviving array is connected to the cloud copy. Such a setup enables a stretched cluster with a cloud backup. If one or more of the local copies is destroyed, a new site can be established from the data backed up to the cloud rather than from the active array. The active array only needs to track changes (i.e., new writes) while the remote mirror is built from the cloud. The arrangement also allows creating point-in-time copies of the data, from the cloud copy, elsewhere. The disclosed arrangement may generally be less expensive than present multi-mirror arrangements, and enables the option of having a disaster recovery site located almost anywhere on the planet.

More specifically, a distributed data storage system is disclosed that provides geographic diversity across at least three sites. The system includes:

a first data storage system at a first site, the first data storage system being configured and operative to remotely mirror data using synchronous and asynchronous channels to respective backup sites, the channels employing a block-based data storage protocol;

a second data storage system at a second site, the second data storage system connected to the synchronous channel to provide synchronous backup for the first data storage system; and a cloud gateway at a third site, the cloud gateway connected to the asynchronous channel and having a cloud storage connection to a cloud storage system, the cloud storage connection using a wide area network interface and employing an object-based data storage protocol, the cloud gateway (1) providing asynchronous backup for the first data storage system via the asynchronous channel, and (2) using the cloud storage connection to access object-based cloud data storage to store data of the asynchronous backup.

The use of the cloud gateway and cloud storage system to provide an asynchronous third mirror enhances reliability/resiliency in a cost-effective manner, and can provide opportunity for addition or enhancement of system features/operations as mentioned above.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
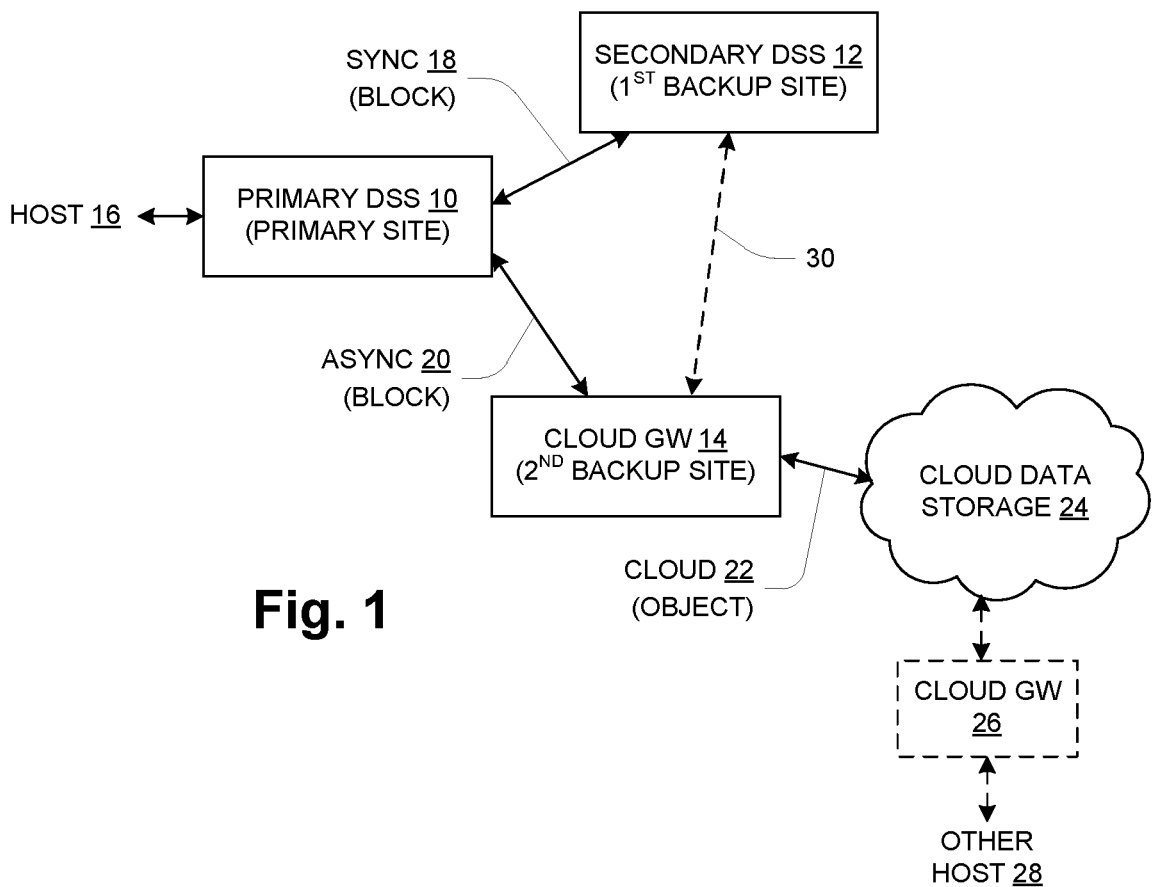
FIG. 1 is a block diagram of an enterprise distributed data storage system.

FIG. 1 shows a distributed data storage system having components at different locations or sites to provide redundancy by geographically distributed replication. In particular, a first or primary data storage system (DSS) 10 is located at a first or primary site; a second or secondary DSS 12 is located at a first backup site; and a cloud gateway (GW) 14 is located at a second backup site. The primary DSS 10 has an interface to a host computer or host 16, as well as connections to respective channels to the secondary DSS 12 and cloud GW 14. In particular, the channel to the secondary DSS 12 is a block-based channel 18 for synchronous replication (SYNC), while the channel to the cloud GW 14 is a block-based channel 20 for asynchronous replication (ASYNC). The cloud GW 14 has a connection to a cloud-protocol, object-based channel 22 to a cloud data storage system or service 24, also referred to as "cloud data storage 24" herein. Additional details about the channels and their use are provided below.

The cloud data storage 24 may have separate connections to other cloud GWs 26 which connect to respective other hosts 28. Such an arrangement can provide certain desirable system functionality as explained more below. Additionally, there may be a separate block-based channel 30 extending between the secondary DSS 12 and the cloud GW 14, whose use is also described below.

In the system of FIG. 1, redundancy is provided in the form of remote mirroring, i.e., maintaining remote copies of storage devices or volumes that are local to the primary DSS 10. In particular, synchronous remote mirroring is performed between the primary DSS 10 and the secondary DSS 12 using the synchronous channel 18, and asynchronous remote mirroring is performed between the primary DSS 10 and the cloud GW 14 using the asynchronous channel 20. In the synchronous mirroring, writes from the host 16 to the primary DSS 10 are also sent to the secondary DSS 12 to update a first (synchronous) mirror, and acknowledged to the host 16 only upon the secondary DSS 12 acknowledging the write to the primary DSS 10. In the asynchronous mirroring, writes from the host 16 are acknowledged when the data is persisted in the primary DSS 10, and the writes are batched and sent in batches periodically to the cloud GW 14 to update a second (asynchronous) mirror.

There is a safety/performance tradeoff in remote mirroring. Synchronous mirroring provides greater safety by ensuring that the writes are persisted remotely before allowing the host 16 to proceed with a next write. However, the need for an acknowledgment from the remote storage system increases the overall write latency and reduces write bandwidth. The performance impact increases as the distance and latency between the primary site and secondary site increases. Asynchronous mirroring largely removes the performance impact, effectively decoupling the host writes from the remote mirror writes, but exhibits lower safety because of the risk of losing batched writes that have not yet been persisted in a remote mirror. The illustrated arrangement employing both synchronous and asynchronous mirroring effectively provides the best of both worlds. For performance, the distance between the primary DSS 10 and secondary DSS 12 is limited to a range providing acceptable latency on the synchronous mirror writes. A general upper limit for this range may be from 0 to 100 km, assuming use of a dedicated high-speed data link. The cloud GW 14 generally may be much further away from the primary DSS 10, because system performance is much less sensitive to the latency of the asynchronous channel 20 and because greater geographic separation can provide greater protection (e.g., against wide-area disasters that might impact both the primary and first backup sites). This distance may be hundreds or even thousands of km for example.

Regarding the channels 18, 20 and 30, "block-based" refers to use of storage-oriented protocols employing the model of a storage device as a linear array of fixed-size blocks, with both reads and writes specifying a starting logical block address (LBA) and a transfer length. SCSI and FibreChannel are well-known examples of such protocols. In contrast, "object-based" for channel 22 refers to use of a more abstracted object-oriented protocol and model. An object is a linear array of data elements analogous to a file, but an object store is generally a flat structure (with objects identified by corresponding unique IDs) in contrast to the conventional hierarchical structure of a file system. Also, the exact structure of an object, and in particular its metadata, may be customized for different applications, while file systems impose a rigid metadata regime on the constituent files. Another view of objects is as application-level structures, such as images, videos, documents, apps, etc. Examples of object-based cloud storage include Amazon S3 and Microsoft Azure.

In the arrangement of FIG. 1, DSS 10 and DSS 12 form what is referred to as an Active-Passive, or A-P, pair. DSS 10 is active in the sense of processing requests from hosts 16, while DSS 12 functions only as a backup repository. An alternative Active-Active (A-A) arrangement is described below in which each DSS of a pair performs both functions, i.e., processes host requests and serves as a backup repository for the other DSS of the pair.

As noted, in one embodiment the channel 30 is used to provide cloud-based mirroring for the secondary DSS 12 as well. In this case, each DSS 10, 12 asynchronously sends data to the cloud data storage 24 via the cloud GW 14. This can ensure the existence of an asynchronous mirror in the cloud should either one of DSS 10 or DSS 12 disappear. In an embodiment in which data is backed up to the cloud from only one DSS (i.e., the primary DSS 10), when one of the DSSs 10, 12 disappears the surviving DSS is connected to the cloud copy.

One benefit of cloud-based mirroring is easier access to the cloud mirror, which can enable or enhance operations. As an example, in the system of FIG. 1 it is relatively easy to obtain a point-in-time copy of a storage device by restoring from the cloud data storage 24, and because of the wide-area accessibility of the cloud data storage 24, this copy can easily be provided almost anywhere there is Internet connectivity, using another cloud GW 26 via which another host 28 can access the cloud copy.

Figure 2:
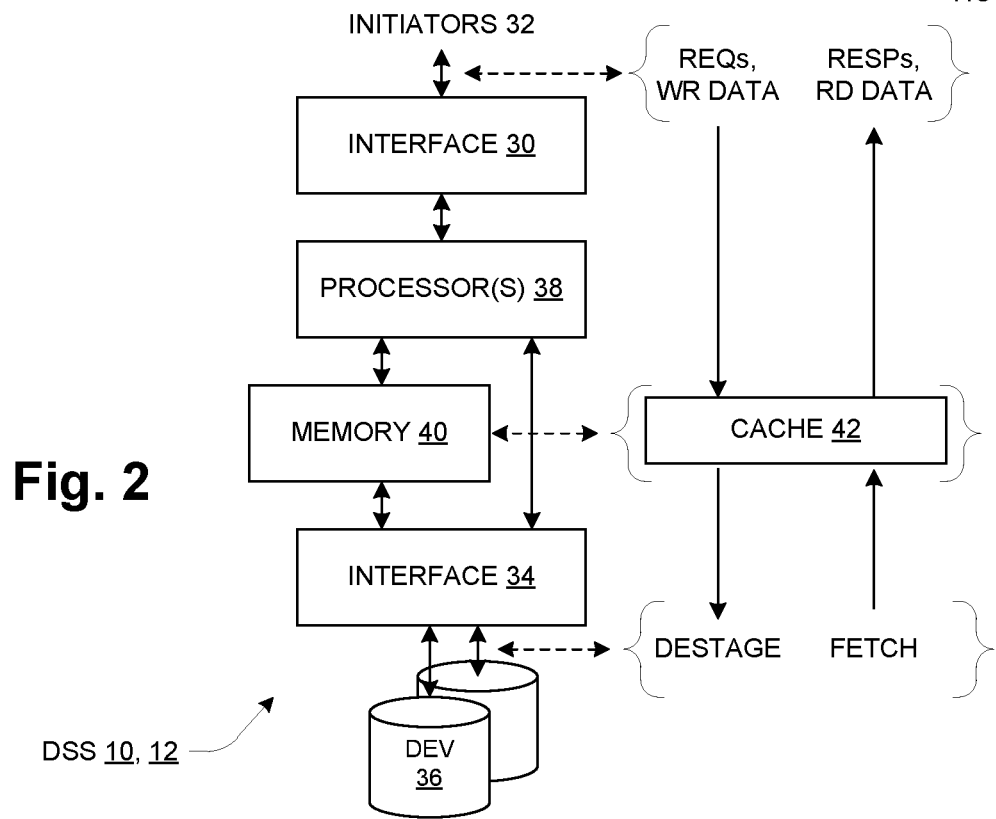
FIG. 2 is a hardware block diagram of a data storage device referred to as a data storage system (DSS)

FIG. 2 shows the general hardware structure of a DSS 10, 12. It includes front-end interface circuitry 30 providing interfaces to initiators 32 of storage requests (e.g., hosts 16), and back-end interface circuitry 34 providing interfaces to physical storage devices 36 (e.g., disk drives, Flash arrays, etc.). It also includes processors 38 and memory 40. Generally in operation, storage requests and write data are processed in the downward direction in FIG. 2, i.e., from the front-end interface circuitry 30 toward the devices 36, while responses and read data are processed in the other direction, i.e., from the devices 36 toward the front-end interface circuitry 30. Device data may be cached in a cache 42 stored in memory 40, in which case there is a decoupling between initiator-facing activity and device-facing activity. Initiator writes and reads may be satisfied by front-end operations to/from the cache 42, while in parallel the cache contents are managed by back-end destaging and fetching to/from the devices 36. Here "fetching" refers to both demand-based data retrieval, e.g., to satisfy a read request when the data is not in the cache 42, as well as any read-ahead or prefetching of data into the cache 42 in anticipation of later use to satisfy future read requests.

FIG. 2 is also generally representative of the hardware content and organization for the cloud GW 14. For the cloud GW 14, the memory 40 may store buffers rather than a true cache. A functional organization for the cloud GW 14 is described below with reference to FIG. 4.

Figure 3:
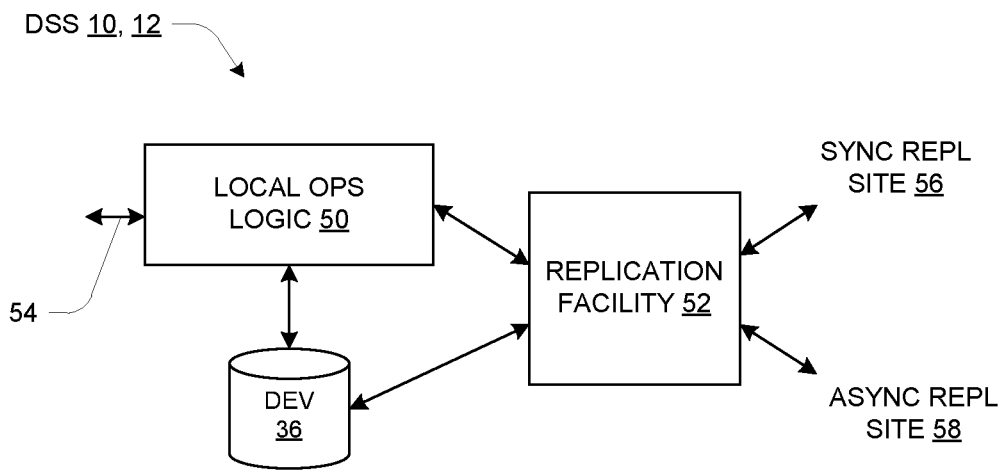
FIG. 3 is functional block diagram of a DSS.

FIG. 3 shows high-level functional organization of a DSS 10, 12. It includes local operations (OPS) logic 50 and a replication facility 52 as shown. The local OPS logic 50 is responsible for processing storage requests at local devices 36 of this DSS, received on connection 54. The replication facility 52 is responsible for the replication or mirroring of local writes to remote systems at other sites, shown as a synchronous replication site (SYNC REPL SITE) 56 and an asynchronous replication site (ASYNC REPL SITE) 58 in FIG. 3. Thus for the primary DSS 10, the local operations logic 50 handles requests of the host 16, and the replication facility 52 mirrors host writes to (1) the synchronous replication site 56, which is the 1$^{st}$ backup site and reached via channel 18 in the arrangement of FIG. 1, and (2) the asynchronous replication site 58, which is the 2$^{nd}$ backup site and reached via channel 20 in FIG. 1. For the secondary DSS 12, the connection 54 is actually a connection to the synchronous replication channel 18 of FIG. 1, via which it receives mirrored writes from the primary DSS 10. When serving as a passive backup as in FIG. 1, the secondary DSS 12 may not contain or utilize the replication facility 52 nor have its own separate replication channels to other sites.

Figure 4:
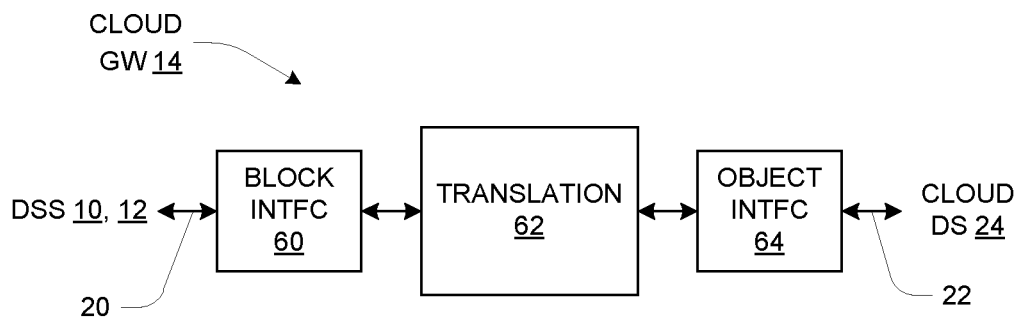
FIG. 4 is a functional block diagram of a cloud gateway.

FIG. 4 shows functional organization of the cloud GW 14. It includes block interface logic 60, translation logic 62, and object interface logic 64. The block interface logic 60 connects to a DSS 10 (and/or 12) by the block-based asynchronous channel 20, and presents a block-based interface, e.g., SCSI. Thus from the perspective of the connected DSS (e.g., primary DSS 10), the cloud GW 14 appears as a block-oriented storage system. The object interface 64 connects to the cloud data storage 24 by the cloud object-based channel 22, and presents an object interface. Thus from the perspective of the cloud data storage 24, the cloud GW 14 appear as a client providing abstracted objects for backup. Additional detail regarding objects is given below. The object interface 64 generally employs an underlying wide-area network interface/protocol, such as HTTP running on top of TCP/IP for example.

The translation logic 62 performs conversion between the block-oriented structuring of data of the block interface 60 and the object-oriented structuring of data of the object interface 64. In one embodiment it maps a storage device defined at the block interface to a file defined at the object interface 64. The translation logic 62 necessarily includes buffering in order to hold data of one format (e.g., block) while translating it to the other (e.g., object) and transferring it out. Because the cloud GW 14 supports only asynchronous mirroring, its write performance is relatively non-critical. Thus the translation logic 62 may also provide for more general decoupling of DSS-facing activities (absorbing DSS writes) from cloud-facing activities (sending writes to the cloud data storage 24), somewhat analogous to the above-described device caching within a DSS 10 or 12. That is, writes from the DSS 10 may be acknowledged once they are persisted in local buffer storage of the translation logic 62, and buffered write data may be destaged to the cloud data storage 24 in a separate background process.

Figure 5:
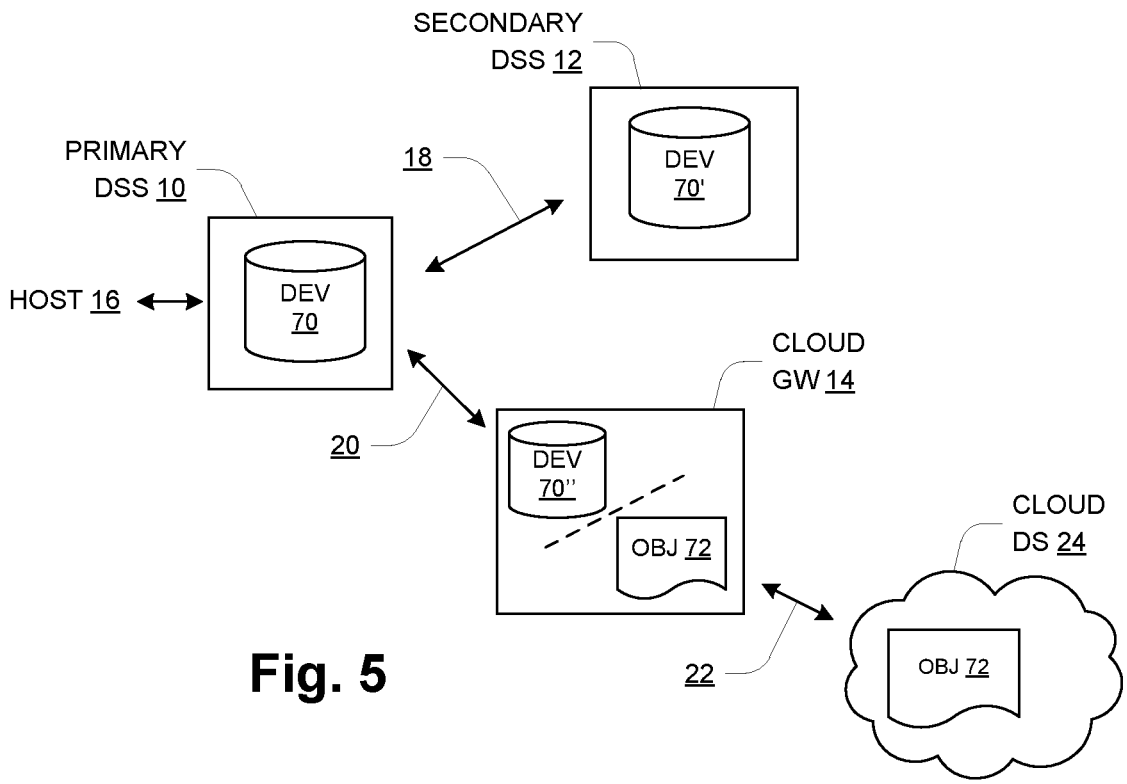
FIG. 5 is a schematic depiction of a primary storage device and mirror copies distributed in the system.

FIG. 5 illustrates high-level operation of the system of FIG. 1 with respect to an individual logical unit of storage, referred to for convenience as a LUN. As shown, both the primary DSS 10 and secondary DSS 12 store respective copies 70, 70' of the LUN, with the copy at the primary DSS 10 being a primary copy 70 and the copy at the secondary DSS 12 being a first backup copy 70', maintained using synchronous mirroring as described above. A representation 70" of the same LUN 70 is also provided by the cloud GW 14, but as illustrated the device data is actually stored as a corresponding object 72 in the cloud data storage 24, by operation of the translation logic 62 (FIG. 4).

Figure 6:
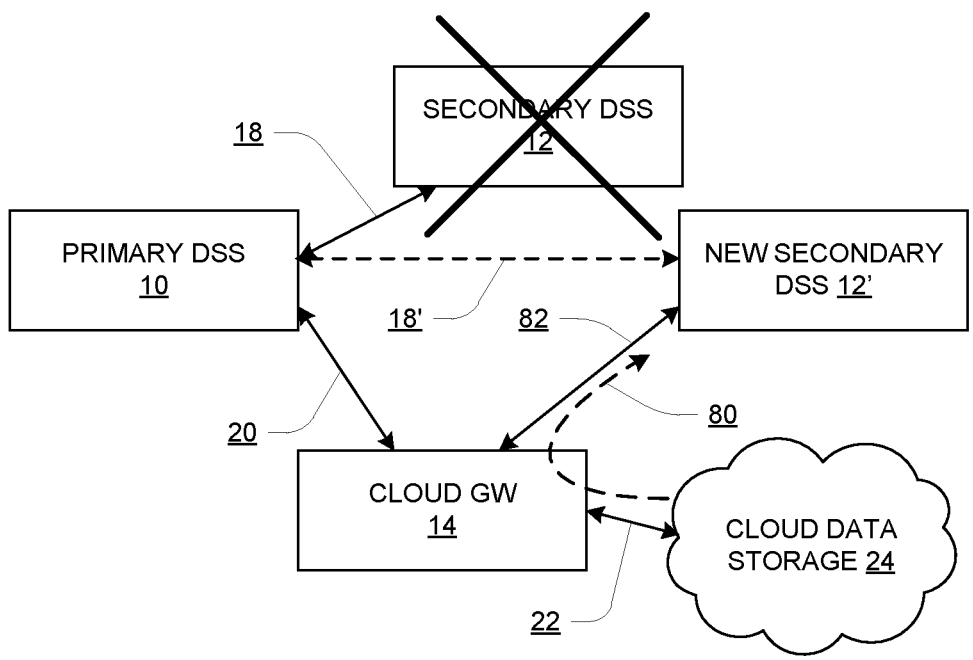
FIG. 6 is a block diagram of the data storage system with insertion of a replacement second DSS.

FIG. 6 illustrates a manner of using backup data stored in object form in the cloud data storage 24 to respond to failure of the secondary DSS 12. It is assumed that the failure is so complete that it is necessary to replace the original secondary DSS 12 with a replacement new secondary DSS 12'. Other failure scenarios are possible, as well as other restoration scenarios for purposes other than failure recovery.

In the illustrated scheme, a new secondary DSS 12' is inserted into the system and all the LUNs of the original secondary DSS 12 are first partially reconstructed using device data obtained from the cloud data storage 24 via the cloud GW 14, as indicated at 80. This data transfer requires a channel 82 between the new secondary DSS 12' and the cloud GW 14. From the time of failure of the original secondary DSS 12 to the completion of restoration from the cloud data storage 24, the primary DSS 10 buffers new host writes, and if necessary applies back-pressure to limit/prevent additional new writes. Once the restoration from the cloud data storage 24 is complete, the primary DSS 10 sends the buffered writes to both the new secondary DSS 12' as well as to the cloud GW 14 for storage in the cloud data storage 24, re-establishing the two-location mirroring of all devices/LUNs.

In prior systems, failure of a synchronous mirror at a secondary DSS 12 requires restoration from the primary DSS 10, and thus involves transferring the entirety of the device data over the channel 18 or 18'. Such operation is costly, time-consuming, and disruptive to other concurrent uses of the channel 18 or its underlying communication infrastructure (e.g., dedicated link as described above). The arrangement of FIG. 6 is an improvement by providing the ability to restore via a relatively inexpensive path between the secondary DSS 12 and the cloud data storage 24.

Another aspect of the disclosed arrangement is the ability to replicate data inexpensively in the cloud data storage 24 for any of a variety of purposes. In prior systems with only non-cloud replication, storage resources of a remote-mirror DSS 12 may be relatively expensive, inhibiting any proliferation of copies of data. This constraint can be relaxed in the disclosed system. It may be easy and inexpensive to create copies of an object 72 in the cloud data storage 24, which correspond to different copies of the asynchronous mirror device 70". This flexibility to create copies can be used in support of a variety of applications or specialized functions, including audit or forensic analysis, checkpointing, wide-area collaboration, etc.

Figure 7:
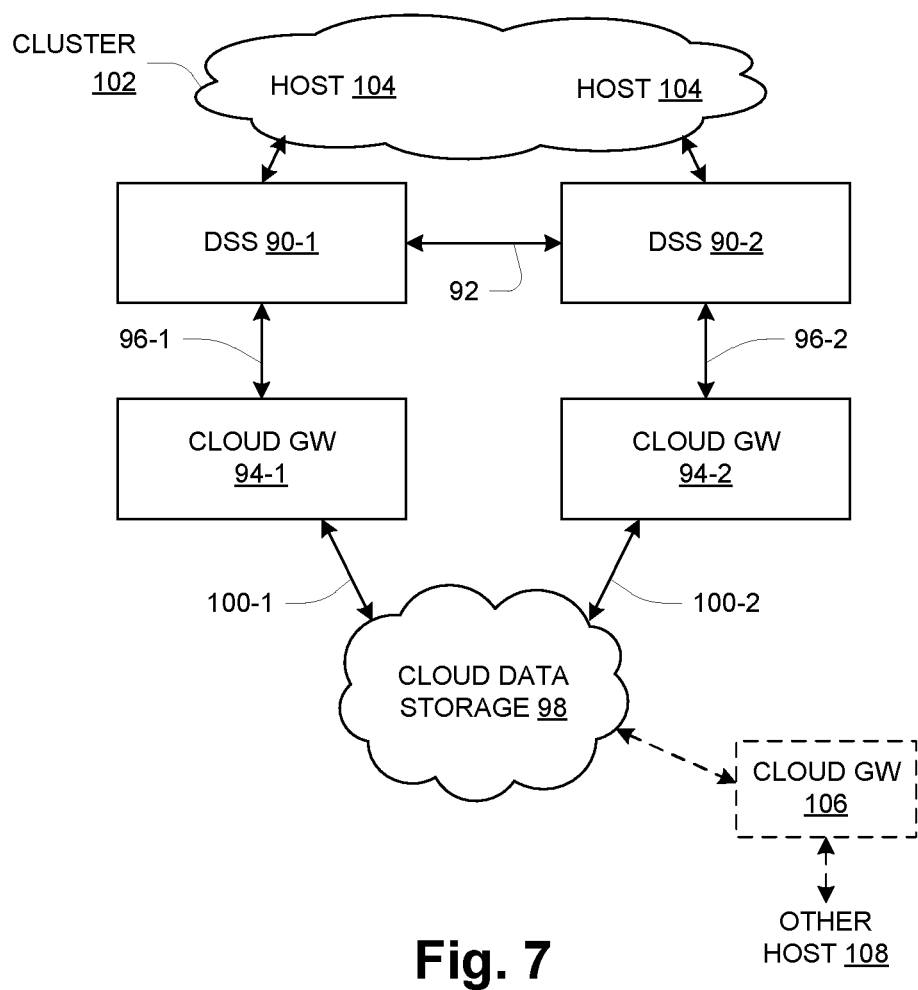
FIG. 7 is a block diagram of an enterprise data storage system according to an alternative arrangement.

FIG. 7 shows an alternative system-level arrangement that is an example of the above-mentioned Active-Active configuration. Two DSSs 90-1, 90-2 are interconnected by a block-based, synchronous channel 92, and each DSS 90 is connected to a respective cloud gateway 94 (94-1, 94-2) by a respective block-based, asynchronous channel 96 (96-1, 96-2). The cloud gateways 94 are connected to cloud data storage 98 by respective object-based cloud storage channels 100 (100-1, 100-2). The DSSs 90 also have respective connections to a cluster 102 of hosts 104. In general, the hosts 104 may direct storage requests to either of the DSSs 90, depending on the structuring of underlying connectivity, but a given host 104 may also have either a hard or soft affinity for a particular DSS 90 causing the host to direct its data storage requests predominantly or exclusively to that DSS 90. As mentioned, each DSS 90 serves as synchronous backup to the other via the synchronous channel 92. Both DSSs generally present the same logical view of storage, e.g., the same set of devices/LUNs. Each cloud GW 94 along with the cloud data storage 98 serves as asynchronous backup to the respective DSS 90 via the respective asynchronous channel 96.

As shown, the system of FIG. 7 may also incorporate another cloud GW 108 connected to the cloud data storage 98 and separate host(s), for similar purposes as those discussed above with reference to FIG. 1.

While various embodiments of the invention have been particularly shown and described, it will be understood by those skilled in the art that various changes in form and details may be made therein without departing from the scope of the invention as defined by the appended claims.

What is claimed is:

1. A distributed data storage system providing geographic diversity across at least three sites, including:
   a first data storage system at a first site, the first data storage system being configured and operative to remotely mirror data using synchronous and asynchronous block-based channels to respective backup sites, the block-based channels employing a block-based data storage protocol being a storage-oriented protocol employing a model of a storage device as a linear array of fixed-size blocks, the storage-oriented protocol using read and write requests specifying a starting logical block address and a transfer length;

a second data storage system at a second site, the second data storage system connected to the first data storage system via the synchronous block-based channel to provide synchronous backup for the first data storage system; and a cloud gateway at a third site, the cloud gateway connected to the first data storage system via the asynchronous block-based channel and having an object-based cloud storage connection to a cloud storage system, the object-based cloud storage connection using a wide area network interface and employing an object-based data storage protocol employing an object-oriented model of a storage device as a flat-structured collection of objects identified by respective object identifiers, the cloud gateway (1) providing asynchronous backup for the first data storage system via the asynchronous block-based channel, and (2) using the object-based cloud storage connection to access object-based cloud data storage to store data of the asynchronous backup, wherein the cloud gateway includes block interface logic, translation logic, and object interface logic, the block interface logic connecting to the first data storage system via the asynchronous block-based channel and presenting a block interface with a block-based view of storage according to the block-based data storage protocol, the object interface logic connecting to the cloud data storage by the object-based cloud storage connection and presenting an object interface according to the object-based data storage protocol, the cloud gateway appearing to the cloud storage system as a client providing abstracted objects for backup, and wherein the translation logic performs conversion between block-oriented structuring of data of the block interface and object-oriented structuring of data of the object interface.

2. The distributed data storage system of claim 1, wherein the first and second data storage systems form an active-passive pair in which the first data storage system processes data storage requests from a host computer and the second data storage system functions only as a backup repository for the synchronous backup.

3. The distributed data storage system of claim 1, wherein the first and second data storage systems form an active-active pair in which both data storage systems process data storage requests from host computers and each data storage system serves as a synchronous mirror for the other data storage system of the pair using the synchronous block-based channel.

4. The distributed data storage system of claim 3, further including a second cloud gateway at a fourth site, the second cloud gateway connected to the second data storage system by a second asynchronous block-based channel and having a second object-based cloud storage connection to a cloud storage system, the second cloud storage connection using a wide area network interface and employing an object-based data storage protocol, the second cloud gateway (1) providing asynchronous backup for the second data storage system via the second asynchronous block-based channel, and (2) using the second object-based cloud storage connection to access object-based cloud data storage to store data of the asynchronous backup for the second data storage system.

5. The distributed data storage system of claim 3, wherein the first and second data storage systems have respective connections to a cluster of host computers, each of the data storage systems receiving data storage requests from one or more of the host computers of the cluster.

6. The distributed data storage system of claim 5, wherein one or more of the host computers have a respective hard or soft affinity for a respective one of the data storage systems, the affinity causing the host computer to direct its data storage requests predominantly or exclusively to the respective data storage system.

7. The distributed data storage system of claim 3, wherein the data storage systems each present the same logical view of data storage provided by the distributed data storage system to the host computers.

8. The distributed data storage system of claim 1, wherein the cloud storage system has a separate connection to a second cloud gateway which connects to a respective host computer, the second cloud gateway obtaining a point-in-time copy of a storage device by performing a restore operation from the asynchronous backup stored in the cloud storage system.

9. The distributed data storage system of claim 1, further including a second asynchronous block-based channel extending between the second data storage system and the cloud gateway, the second asynchronous block-based channel being used to provide cloud-based mirroring for the second data storage system, and wherein each of the data storage systems asynchronously sends data to the cloud data storage system via the cloud gateway to ensure existence of an asynchronous mirror in the cloud storage system should either one of the first or second data storage systems fail.

10. The distributed data storage system of claim 1, wherein upon a failure of the second data storage system a new second data storage system is added to the system and all the data of the failed second data storage system is first partially reconstructed using device data obtained from the cloud data storage system via the cloud gateway, and wherein the first data storage system is operative in response to the failure to buffer new writes until completion of the partial reconstruction and to send the buffered writes to both the new second data storage system to completely restore the data and to the cloud gateway for storage in the cloud data storage system.

11. The method claim 10, wherein the translation logic includes buffering to temporarily store data having block-oriented structuring while translating the data to the object-oriented structuring and transferring the translated data to the cloud storage system.

12. The distributed data storage system of claim 1, wherein the object store and set of object identifiers have a flat, non-hierarchical structure, and wherein the objects have a structure of associated metadata specifically tailored for the cloud storage application.

13. The distributed data storage system of claim 1, wherein the objects are further organized as respective application-level structures including images, videos, documents, and apps.

14. The distributed data storage system of claim 1, wherein the translation logic maps a storage device defined at the block interface to a file defined at the object interface.

15. The distributed data storage system of claim 1, wherein the translation logic includes buffering to temporarily store data having block-oriented structuring while translating the data to the object-oriented structuring and transferring the translated data to the cloud storage system.

16. The distributed data storage system of claim 15, wherein the translation logic provides for general decoupling between operations of the block interface logic and activities of the object interface logic by (1) acknowledging writes received from the first data storage system once they are persisted in local buffer storage of the translation logic, and (2) destaging buffered write data from the local buffer storage of the translation logic to cloud data storage system in a separate background process.

17. The distributed data storage system of claim 1, wherein the object interface employs an underlying wide-area network interface and protocol.

18. A method of operating a distributed data storage system providing geographic diversity across at least three sites, comprising:
by a first data storage system at a first site, remotely mirroring data using synchronous and asynchronous block-based channels to respective backup sites, the block-based channels employing a block-based data storage protocol being a storage-oriented protocol employing a model of a storage device as a linear array of fixed-size blocks, the storage-oriented protocol using read and write requests specifying a starting logical block address and a transfer length;
by a second data storage system at a second site and connected to the first data storage system via the synchronous block-based channel, providing synchronous backup for the first data storage system; and
by a cloud gateway at a third site and connected to the first data storage system via the asynchronous block-based channel, (1) providing asynchronous backup for the first data storage system via the asynchronous block-based channel, and (2) using an object-based cloud storage connection to a cloud storage system to access object-based cloud data storage to store data of the asynchronous backup, the object-based cloud storage connection using a wide area network interface and employing an object-based data storage protocol employing an object-oriented model of a storage device as a flat-structured collection of objects identified by respective object identifiers,
wherein the cloud gateway includes block interface logic, translation logic, and object interface logic, the block interface logic connecting to the first data storage system via the asynchronous block-based channel and presenting a block interface with a block-based view of storage according to the block-based data storage protocol, the object interface logic connecting to the cloud data storage by the object-based cloud storage connection and presenting an object interface according to the object-based data storage protocol, the cloud gateway appearing to the cloud storage system as a client providing abstracted objects for backup,
and wherein the translation logic performs conversion between block-oriented structuring of data of the block interface and object-oriented structuring of data of the object interface.

19. The method of claim 18, wherein upon a failure of the second data storage system a new second data storage system is added to the system and all the data of the failed second data storage system is first partially reconstructed using device data obtained from the cloud data storage system via the cloud gateway, and wherein the first data storage system is operative in response to the failure to buffer new writes until completion of the partial reconstruction and to send the buffered writes to both the new second data storage system to completely restore the data and to the cloud gateway for storage in the cloud data storage system.

20. The method of claim 18, wherein the translation logic maps a storage device defined at the block interface to a file defined at the object interface.

\* \* \* \* \*